Patented Apr. 15, 1941

2,238,337

UNITED STATES PATENT OFFICE 2,238,337

SHOE STIFFENER

Harold S. Miller, Quincy, Mass., assignor to Beckwith Manufacturing Company, Dover, N. H., a corporation of New Hampshire No Drawing. Application November 9, 1939, Serial No. 303,583

4 Claims. (Cl. 36—77)

This invention relates to shoe stiffeners such as box toe blanks and counters which are commonly placed in the upper prior to the lasting operation and may be temporarily softened by heat or solvent and subsequently caused to stiffen while the upper is conformed to the last.

Such stiffeners are usually manufactured in sheet form and then died out into the shapes and sizes desired, a procedure heretofore involving a serious and unavoidable waste of material. The died out blanks are then skived so that they present a beveled marginal edge and the skiving operation involves further waste of material.

The present invention consists in a novel process of making shoe stiffeners, or sheet material for shoe stiffeners, characterized by the direct utilization of box toe or counter scrap in the condition it is produced by the dieing out and skiving operations referred to above. The invention includes within its scope the novel box toe or counter blank and the sheet material therefor herein disclosed as produced by the practice of my novel process.

My invention permits the utilization of box toe scrap which has hitherto had no value in the industry. It provides a process well adapted to be carried out under commercial conditions at low cost and without necessitating the expense of preliminary processing steps upon the scrap material. It is characterized by the introduction of the scrap material into the process in a dry condition and just as it is collected from the floor of the cutting room in which it is produced. The box toe produced by my novel process, beside being extremely economical to produce, has features which render it advantageous for the shoe manufacturer to use.

My invention will be best understood and appreciated from the following detailed description of one way in which it may be put into effect in producing a thermoplastic box toe blank, that is to say, a blank which is normally stiff, but which may be temporarily softened by heat during the lasting operation and then allowed to harden in the shoe with the shape of the last.

The following formula is one which I have found entirely satisfactory and which is herein set forth as illustrative or typical of my invention, but not limiting it:

| | Pounds |
|---|---|
| Reclaimed rubber | 130 |
| Box toe scrap | 400 |
| Asbestos fibre | 200 |
| Cumarone resin | 100 |

The rubber which I prefer to use in the illustrative formula may be reclaimed from worn tires and the like by any well known commercial process. This material is entirely satisfactory for the purposes of my invention and is economical to use, although smoked rubber sheet or rubber in other form may be employed if the conditions warrant additional expense. This 130 lbs. of rubber is first milled by itself between the heated rolls of a Banbury mill, such as are commonly used in the rubber industry, until it is transformed into a plastic homogeneous mass.

After ten or fifteen minutes of milling the rubber mass in this manner, the box toe scrap material may be added directly to the mass upon the rolls. This scrap of sheet material containing rubber, fibre and synthetic resin, waxes or gums may be added in proportion at least twice that of the rubber ingredient, or in the illustrative case, 400 lbs. It may be bundled up in dry condition just as it is cut and delivered to the rolls without preliminary treatment of any kind. In practice it is rapidly milled into the rubber mass, being agglomerated and intimately mixed therewith and rapidly broken down with the previously milled rubber into one indistinguishable plastic mass upon the rolls. If desired, a small amount of moisture may be added during this milling process and the amalgamating effect thereof is thereby somewhat expedited. In the course of 15 or 20 minutes' milling the 400 lbs. of scrap completely loses its identity. Upon the rolls of the milling machine there appears only a homogeneous mass of hot plastic material, somewhat fibrous in its composition and adhesive in consistency.

When the blended rubber and scrap have reached this condition it is desirable to add a polymerized resin for the purpose of giving fluidity to the mix and hardness to the resulting product. For this purpose, and in the illustrative formula, I prefer to add 100 lbs. of cumarone resin to the rubber and scrap mixture in process of milling upon the rolls. This may be added in lumps as convenient and is immediately worked into plastic mass and becomes an indistinguishable part thereof. It will be understood that other compatible thermoplastic materials or other polymerized or synthetic resins may be used in place of or in combination with cumarone resin.

At the conclusion of this step about 200 lbs. of asbestos fibre is added directly to the plastic mass upon the rolls and in the course of a few minutes' milling this fibre becomes uniformly distributed throughout the plastic mass. In the milling operation there is no substantial impairment or shortening of the fibres introduced either in the scrap material or in the supplementing asbestos fibre. The fibre ingredient is desirable to supply good binding and strength and to prevent cracking in the resulting product, and the asbestos fibre is supplied to bring up this ingredient of the mixture. While I prefer to use asbestos fibre for reasons of economy and convenience, it would be within the scope of the invention to employ other fibrous materials as a substitute for or in combination with the asbestos fibre, such as animal hair, cotton flock, jute, cotton linters or wool shoddy.

After the ingredients of the formula have been milled together as above explained, the hot plastic mass is removed from the Banbury rolls and preferably subjected to a kneading operation in any suitable and convenient apparatus, for example, that known to the industry as the W. F. mixer. In this operation the mass is kneaded by being pulled out and then balled up by a series of arms moving in approaching and receding manner. This operation is desirable to improve the homogeneity of the mass and to pull out and lay the fibres effectively therein.

It may be advantageous in some cases to modify the character of thermoplastic mix by instituting a partial setup or cure. This is accomplished by adding to the formula a suitable amount of sulphur, zinc oxide and accelerators. This is in line with the practice in rubber compounding, and sufficient amounts may be added to bring about the desired effect without adversely affecting the thermoplasticity of the resulting product.

At the conclusion of 10 or 15 minutes of kneading in this manner the hot plastic mass may be removed from the mixer, and converted into sheet form. One desirable process of utilizing the mixture is to calender it directly upon a textile backing sheet, and this may be a web of loosely woven cotton fabric. The hot plastic mass is calendered upon such a web with sufficient pressure to embed the threads of the fabric in the plastic material and since the material is adhesive in this form a firm and permanent bond is formed between the two. Preferably both the fabric side and the plastic side of the calendered sheet are sized as they pass from the calender rolls. Thus there is continuously produced a composite sheet of uniform thickness which hardens as it passes from the calender rolls and presents a textile backing on one side and a smooth homogeneous plastic surface on the other. This sheet material may be at once converted into individual box toe blanks by the usual dieing out operations, and the blanks may be skived preparatory to their use in the shoemaking process.

Box toe blanks produced in this manner have substantially the same characteristics in respect to softening when subjected to heat and stiffening in the finished shoe as box toe blanks prepared from virgin material.

They take a desirable smooth surface finish from the calender rolls and their fibre content is such as to render them tough so that they are not damaged when subjected to pulling over and lasting stress in the shoemaking processes. They are adhesive when heated and readily form a bond with the doubler or liner of the shoe, and in all other respects may be employed with success under the most exacting requirements of shoe manufacture but at a substantially reduced cost as compared to box toe blanks of similar quality hitherto available in the industry.

While I have referred specifically to reclaimed rubber or smoked rubber sheet as an ingredient of the formula herein disclosed I have in mind that other rubber-like materials may be substituted in the formula to a greater or lesser extent such, for example, as factice, balata, Neoprene, or Buna.

Having thus disclosed my invention and described an illustrative example of the best way now known to me for putting it into practice, I claim as new and desire to secure by Letters Patent:

1. Sheet material for thermoplastic shoe stiffeners, comprising in its composition approximately 130 parts rubber, 400 parts resin-containing box toe scrap, 100 parts cumarone resin and 200 parts asbestos fibre.

2. Sheet material for thermoplastic shoe stiffeners, comprising a continuous fabric web embedded in a thermoplastic composition including approximately 15% rubber, 48% box toe scrap, 12% polymerized resin, and 24% tough fibrous material.

3. Thermoplastic sheet material comprising a continuous fibrous web impregnated with a thermoplastic composition including approximately: 15% a material selected from the group consisting of rubber, factice, balata, Neoprene, and Buna, 48% box toe scrap containing a resin, 24% a material selected from the group consisting of asbestos, animal hair, cotton flock, jute, cotton linters, and wool shoddy; and 12% a thermoplastic resin.

4. An improved thermoplastic box toe blank, normally hard with a smooth surface and having adhesive properties when rendered plastic by the application of heat, the blank comprising in its composition a foundation web of fibrous material impregnated and coated with a composition of rubber with vulcanizing agents, resin-containing box toe scrap in proportion at least twice that of the rubber ingredient, and a polymerized resin.

HAROLD S. MILLER.